(12) United States Patent
DeCusatis et al.

(10) Patent No.: US 8,589,929 B2
(45) Date of Patent: Nov. 19, 2013

(54) SYSTEM TO PROVIDE REGULAR AND GREEN COMPUTING SERVICES

(75) Inventors: Casimer M. DeCusatis, Poughkeepsie, NY (US); Rajaram B. Krishnamurthy, Wappingers Falls, NY (US); Michael Onghena, Poughquag, NY (US); Anuradha Rao, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 13/102,622

(22) Filed: May 6, 2011

(65) Prior Publication Data

US 2012/0284730 A1  Nov. 8, 2012

(51) Int. Cl.
*G06F 9/46* (2006.01)

(52) U.S. Cl.
USPC ............ 718/100; 718/101; 718/102; 713/320

(58) Field of Classification Search
None
See application file for complete search history.

(56) References Cited

U.S. PATENT DOCUMENTS

| | | | |
|---|---|---|---|
| 5,715,443 A | 2/1998 | Yanagihara et al. | |
| 6,178,362 B1 | 1/2001 | Woolard et al. | |
| 6,785,675 B1 | 8/2004 | Graves et al. | |
| 7,702,932 B2 | 4/2010 | Guo et al. | |
| 7,711,943 B2 | 5/2010 | Chang et al. | |
| 7,742,830 B1 * | 6/2010 | Botes | 700/32 |
| 7,774,629 B2 | 8/2010 | Huang et al. | |
| 7,917,625 B1 | 3/2011 | Cook | |
| 2008/0209234 A1 * | 8/2008 | Clidaras et al. | 713/300 |
| 2009/0187782 A1 | 7/2009 | Greene et al. | |
| 2009/0204916 A1 | 8/2009 | Benedek et al. | |
| 2009/0215540 A1 | 8/2009 | Perlman et al. | |
| 2009/0276649 A1 | 11/2009 | Hamilton et al. | |
| 2009/0327775 A1 * | 12/2009 | Hamilton et al. | 713/320 |
| 2010/0050180 A1 | 2/2010 | Amsterdam et al. | |
| 2010/0125473 A1 | 5/2010 | Tung et al. | |
| 2010/0235654 A1 * | 9/2010 | Malik et al. | 713/300 |
| 2010/0235840 A1 * | 9/2010 | Angaluri | 718/102 |
| 2010/0241881 A1 * | 9/2010 | Barsness et al. | 713/320 |
| 2011/0016214 A1 | 1/2011 | Jackson | |
| 2011/0185063 A1 * | 7/2011 | Head et al. | 709/226 |
| 2011/0246987 A1 * | 10/2011 | Diwakar et al. | 718/1 |

OTHER PUBLICATIONS

Smart Energy Living Alliance [online] [retrieved on Mar. 1, 2011] retrieved from the Internet http://smartenergyliving.org 2008.

* cited by examiner

*Primary Examiner* — Emerson C. Puente
*Assistant Examiner* — Dong Kim
(74) *Attorney, Agent, or Firm* — Cantor Colburn LLP; Steven Chiu

(57) ABSTRACT

A system is provided. The system includes a computing device by which first and second commands are inputted, first and second resources disposed in communication with the computing device to be receptive of the first command and responsive to the first command with first and second energy demands in first and second response times, respectively and a managing unit. The managing unit is disposed in communication with the computing device to be receptive of the first and second commands and with the first and second resources to allocate tasks associated with the first command to one of the first and second resources. The tasks are allocated in accordance with the second command and the second command is based on the first and second energy demands and the first and second response times.

14 Claims, 4 Drawing Sheets

SYSTEM TO PROVIDE REGULAR AND GREEN COMPUTING SERVICES

BACKGROUND

The present invention relates to a system to provide computing services and, more particularly, to a system to provide computing services at different energy demands and response times.

Questions surrounding various entities abilities to deliver software and computing services quickly and inexpensively are likely to dominate software usage models in the coming years. In one common arrangement, a customer (i.e., user) connects to a network by way of a client computer and requests that some type of computing operation be completed by other computing resources associated with the network. For example, the customer may request that a search be completed for a given topic or that a more substantial computation is completed involving massive amounts of data. In either case, various computing resources associated with the network would be able to respond to the request. Especially in the case of requests involving substantial computational effort, the computing resources may include some resources that are capable of responding to the requests with relatively fast response times but relatively high energy demands and other resources that are capable of responding to the requests with relatively slow response times but relatively low energy demands.

In general, customers of the software and computing services have been and will likely remain interested in having their requests responded to with the shortest response time possible. However, as customers begin to look to limit their energy footprints by use of ecologically friendly products, it is likely that they may be willing to sacrifice at least some response time performance for more ecologically friendly computing or software services.

SUMMARY

According to an aspect of the present invention, a system is provided. The system includes a computing device by which first and second commands are inputted, first and second resources disposed in communication with the computing device to be receptive of the first command and responsive to the first command with first and second energy demands in first and second response times, respectively and a managing unit. The managing unit is disposed in communication with the computing device to be receptive of the first and second commands and with the first and second resources to allocate tasks associated with the first command to one of the first and second resources. The tasks are allocated in accordance with the second command and the second command is based on the first and second energy demands and the first and second response times.

According to another aspect of the present invention, a method of managing energy consumption in a system is provided. The method includes receiving first and second commands inputted into a computing device, determining first and second energy demands and first and second response times of first and second resources, respectively, in responding to the first command and allocating tasks associated with the first command to one of the first and second resources. The allocating is in accordance with the second command and the second command is based on the first and second energy demands and the first and second response times.

According to yet another aspect of the present invention, a computer program product for managing energy consumption in a system is provided. The computer program product includes a tangible storage medium readable by a processing circuit and storing instructions for execution, by the processing circuit. The method includes receiving first and second commands inputted into a computing device, determining first and second energy demands and first and second response times of first and second resources, respectively, in responding to the first command and allocating tasks associated with the first command to one of the first and second resources. The allocating is in accordance with the second command and the second command is based on the first and second energy demands and the first and second response times.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with aspects of the invention, a computer or software service provider provides regular services as well as green services. The green service will attempt to complete requests using a reduced set of computing resources leading to corresponding reductions in power and energy and ultimately reductions in the energy footprint of a given operation. The service provider can provide an upper bound on time required to complete a given green service. The service provider can also provide an estimate of the resource savings when the service is completed. This can be expressed in terms of energy footprint. This allows the service to be useful in a high performance business setting as well as help customers reduce their energy footprints.

Figure 1:
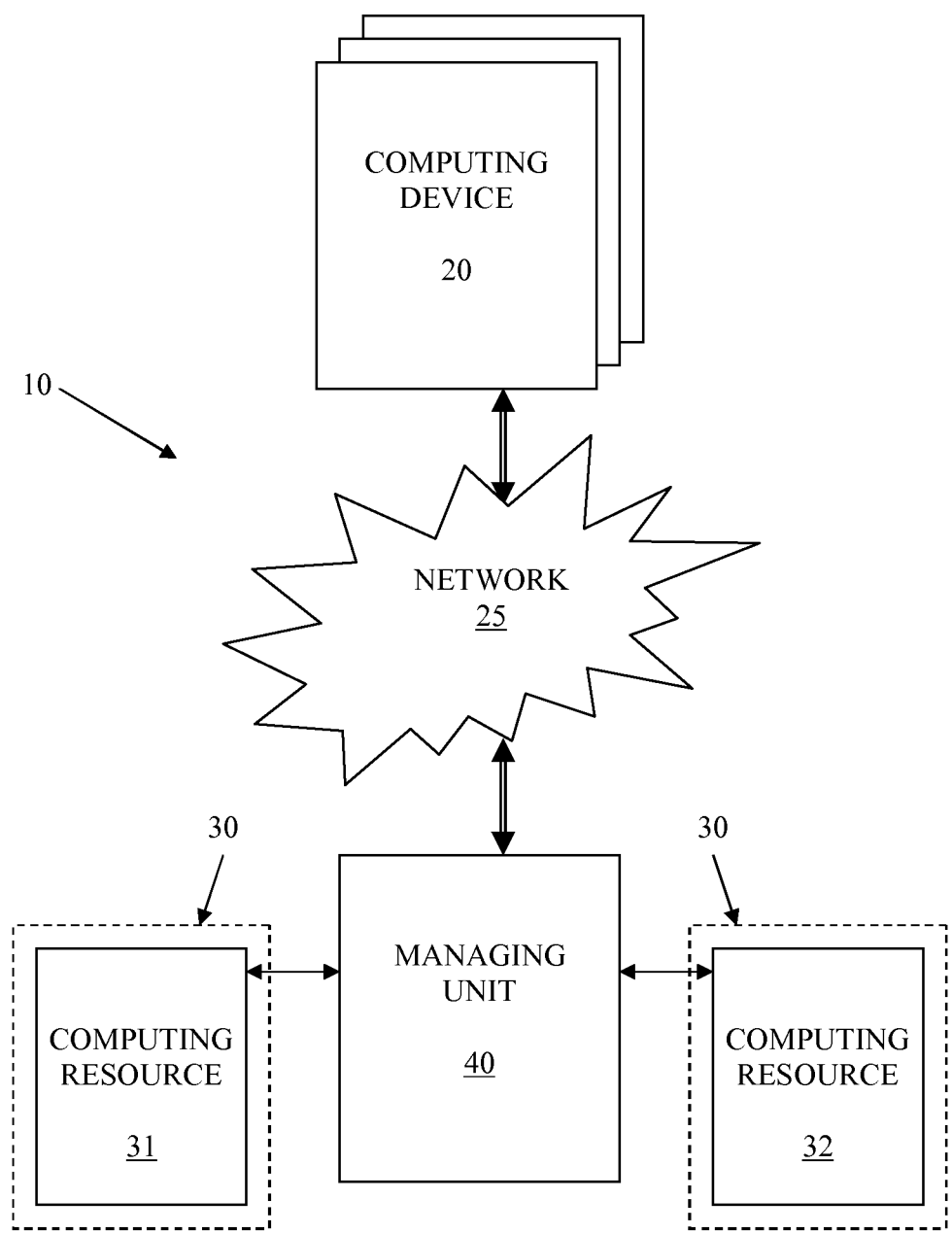
FIG. 1 is a schematic illustration of a system in which energy consumption is managed.

With reference now to FIG. 1, a system 10 is provided and includes a computing device 20, which is one of multiple computing devices each used by a customer of a network 25. The network 25 may be any computing or cloud computing network, such as the Internet, and is hosted by an economic entity, such as a computing and/or software service provider, by which computing and/or software services are provided for various computing requests. The computing requests may be simple internet searches or more substantial computational activities involving large amounts of data and analysis.

The system 10 further includes a plurality of computing resources 30, such as first and second datacenters 31, 32, which are associated with the network 25. Each datacenter 31, 32 may be remote or proximate to another datacenter and/or to the computing device 20. Often, each of the first and second datacenters 31, 32 will have their own computing architecture, computing capabilities, power demands and power supplies. For example, the first datacenter 31 may have modern computing resources with a large memory capacity and may be relatively close to a power plant using an ecologically friendly fuel for generating power, such as a solar power plant. By contrast, the second datacenter 32 may have older computing resources with limited capacity and may be far from its main power plant, which is a conventional fossil fuel burning plant. In this case, the first datacenter 31 may be able to handle a given computing request much faster and with a lesser environmental impact than the second datacenter 32. In this case, it is likely that a customer would prefer that the network use the first datacenter 31 instead of the second datacenter 32 for responding to the customer's requests. However, in many cases, the choice between the first and second datacenters 31 and 32 will not be clear and will involve a number of tradeoffs between response times and ecological impact.

As a general matter, the first and second datacenters 31, 32 are disposed in communication with the computing device 20 and are thereby receptive of the first command and responsive to the first command with first and second energy demands in first and second response times, respectively. The first and second energy demands may refer to various values including, but not limited to, expected energy requirements, expected energy costs, energy footprints of the first and second datacenters 31, 32 and/or fuel types used to generate energy for the first and second datacenters 31, 32.

The system 10 also includes a managing unit 40, such as a computing device, that is dependent or independent of the computing device 20 and the first and second datacenters 31, 32. Thus, the managing unit 40 is disposed in communication with the computing device 20 to be receptive of the first and second commands and is disposed in communication with the first and second datacenters 31, 32. As such, the managing unit 40 is disposed to allocate tasks associated with the first command to one of the first and second datacenters 31, 32 in accordance with the second command, where the second command is based on the first and second energy demands and the first and second response times. It will be understood that the managing unit may be distributed across the first and second datacenters 31, 32. In this case, a request from the computing device 20 may be sent to the managing unit 40 in one or both of the first and second datacenters 31, 32. Each component of the managing unit 40 in each datacenter may interact to respond to the needs of the computing device 20.

Each of the first and second datacenters 31, 32 may also include a workload scheduler. For example, the first datacenter 31 may include a workload scheduler that provides "regular" service and the second datacenter 32 may include a workload scheduler that provides "green" service. The managing unit 40 and the first and second datacenters 31 and 32 may all be housed together. In this case the first and second datacenters 31, 32 and the managing unit 40 work cooperatively to schedule tasks on the same computing resources. For example, workload schedulers may schedule tasks with assistance from the managing unit 40 on the computing resources of the "green" second datacenter 32 when ecologically-friendly energy sources are being used.

Figure 2:
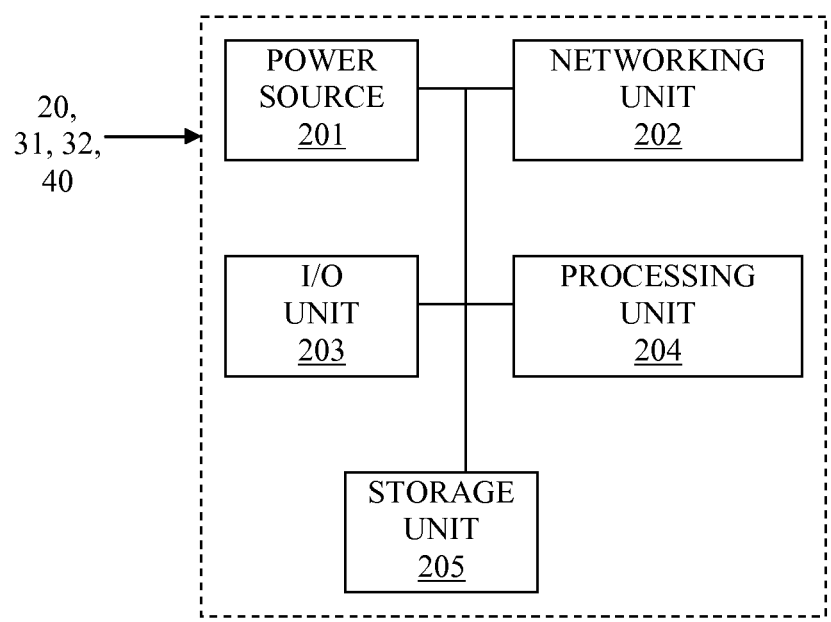
FIG. 2 is a schematic illustration of a computing device.

With reference to FIG. 2, the computing device 20, the first and second datacenters 31, 32 and the managing unit 40 may each be any type of computing device, personal computer, server, etc. As a general matter, one or more of the computing device 20, the first and second datacenters 31, 32 and the managing unit 40 includes a power source 201, a networking unit 202, an input/output (I/O) unit 203, a processing circuit or unit 204 and a tangible storage medium or unit 205. The power source 201, as mentioned above, may be any type of power source locally available with each type having a respective ecological impact. The networking unit 202 allows for communication between the computing device 20, the first and second datacenters 31, 32 and the managing unit 40. The I/O unit 203 may be a keyboard, a touchpad or a mouse and, in the case of the computing device 20, permits input of the first and second commands. The processing circuit or unit 204 may be a central processing unit (CPU) or a microprocessor.

Where the first and second datacenters 31, 32 include workload schedulers, each workload scheduler has a run queue, wait queue and scheduling and dispatch logic. Tasks in the run queue are currently running, while tasks in the wait queue are waiting to be scheduled. Scheduling and dispatch logic uses task completion and energy footprint requirements to schedule and dispatch tasks on computing resources.

The storage unit 205 may be embodied as a computer or machine readable medium having executable instructions stored thereon. When executed, in the exemplary case of the managing unit 40, the executable instructions cause the processing unit 204 of the managing unit 40 to be receptive of the first and second commands where the first command may include a request for computing or software service and the second command may include an indication of a preference for a response to the first command with the first or the second energy demand and/or the first or the second response time. Here, the executable instructions further cause the processing unit 204 to allocate tasks associated with the first command to one of the first and second datacenters 31, 32 in accordance with the second command. To this end, the storage unit 205 of the managing unit 40 includes one or more databases having data stored thereon, which is reflective of the expected energy requirements, expected energy costs, energy footprints of the first and second datacenters 31, 32 and/or fuel types used to generate energy for the first and second datacenters 31, 32 such that the managing unit 40 can make a determination as to how much energy will be required for execution of certain tasks. The one or more databases may further include additional data, which is reflective of the computing speed capabilities of the first and second datacenters 31, 32 such that the managing unit 40 can make a determination as to how long the execution of the certain tasks will take.

Figure 3:
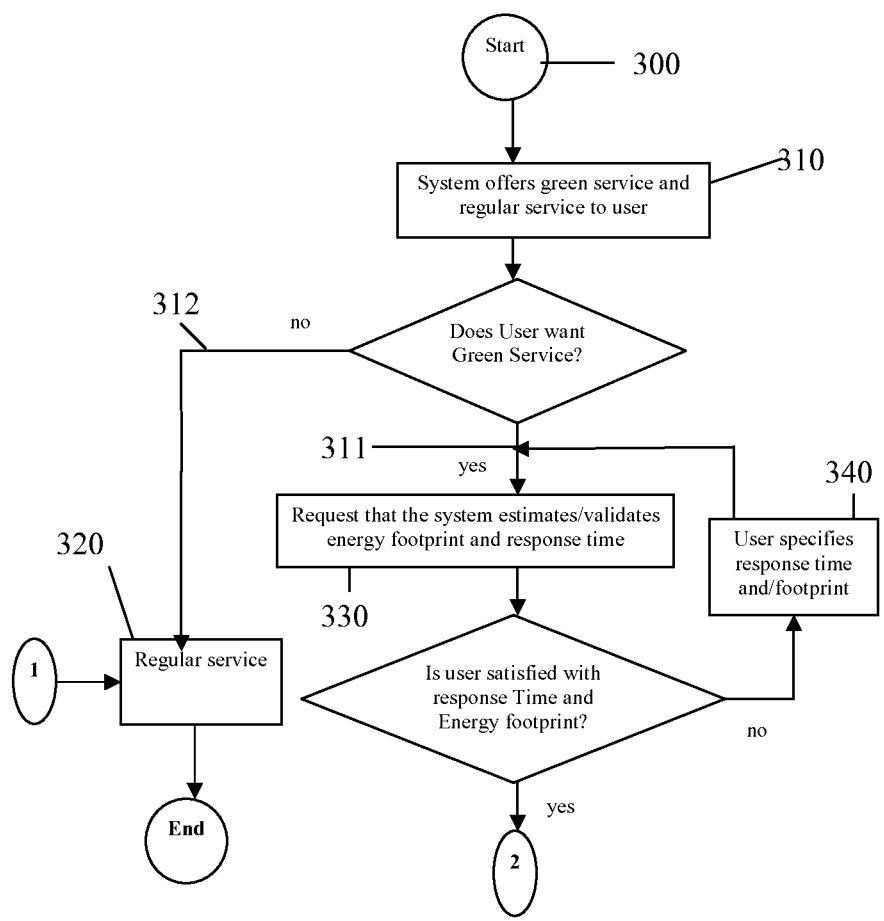
FIG. 3 is a flow diagram illustrating an operation of the system of FIG. 1.

For example, with reference to FIG. 3, a user of computing device 20 may input a search request into the computing device 20 as a first command at the start operation 300. In response, the system 10 or, more particularly, the managing unit 40 presents the user with an offer for "green" service having certain environmental advantages and possible computing disadvantages at operation 310. This offer may include information retrieved by the managing unit 40 from the databases thereof as to the respective energy footprints and response times of the first and second datacenters 31, 32 for the tasks in question. In an example, one of the first and second datacenters 31, 32 may be a green option having a lower energy footprint and a longer response time and the other may be a regular option having a higher energy footprint and a shorter response time.

The user then responds to the offer by inputting either an affirmative response or a negative response into the computing device 20 as a second command at operation 311 or operation 312. If the user elects not to proceed with the green service, control proceeds to operation 320. At this point, the managing unit 40 allocates the search request to the one of the first and second datacenters 31, 32 representing the regular option and thereafter the search request is handled in the regular course. If, however, the user elects to proceed with the green service, the managing unit 40 allocates the search request to the one of the first and second datacenters 31, 32 representing the green option and thereafter the search request is handled in the green course.

If the user enters the affirmative response and, in accordance with additional embodiments, the user may respond to the offer by inputting by way of the computing device 20 a request as a third command at operation 330. The third command request may be for the system to provide an estimate and/or validation of the first and second energy demands and/or the first and second response times of the first and second datacenters 31, 32. In this case, the managing unit 40 is responsive to the third command and configured to provide such an estimate/validation for the first and second energy demands and/or the first and second response times. If the user is satisfied with the response from the managing unit 40 to the third command request, the user can indicate such satisfaction and the green service can commence at "2." If, however, the user is unsatisfied, the user may input by way of the computing device 20 a fourth command at operation 340 as an upper bound for the first and second energy demands and/or the first and second response times. If the user's upper bound is possible, the managing unit 40 will accept the instruction and the green service will proceed. If not, the managing unit 40 and the user may "negotiate" until a final agreement for the green service is reached.

In accordance with further embodiments, the user's upper bound may be related to energy demands, response times and/or several other factors. For example, the user may choose sustainability options for fuel/energy to be used by the chosen datacenter. These options may include fossil fuels, hydro-electric energy, nuclear fuels, wind energy, solar power, etc. The user may also specify a location of the chosen datacenter in terms of its proximity of to an energy source and the presence of the datacenter in natural cooling location (i.e., the mountains or the arctic).

Figure 4:
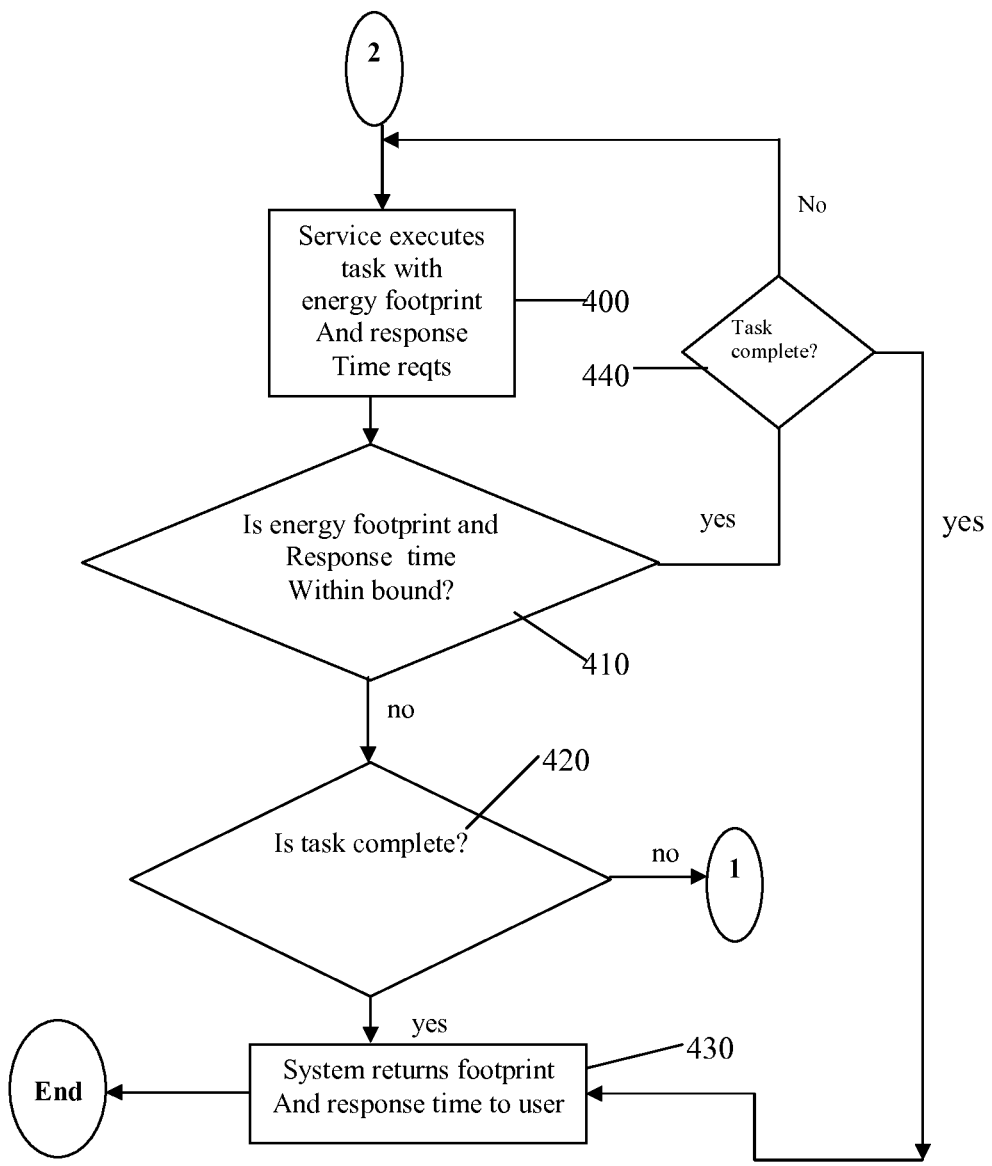
FIG. 4 is a flow diagram illustrating a further operation of the system of FIG. 1.

With reference to FIG. 4, once the green service commences at "2" and execution of the exemplary search request proceeds at operation 400, it is determined at operation 410 whether the energy demand and response time are within the bound established by either the original estimate or the user's agreed upon bound. If the energy demand and response time are within the bound, execution continues as will be described below and, if not, control proceeds to operation 420 where it is determined whether the execution is complete. If execution is incomplete, control proceeds to "1" where, as shown in FIG. 3, operation 320 is executed and the search request is handled in the regular course. If execution is complete, the managing unit 40 issues a report of energy demand and/or response time to the user at operation 430. If the energy demand and response time are determined at operation 410 to be within the bound, it is determined at operation 440 whether the task is complete. If so, control proceeds to operation 430 and, if not, control returns to operation 400 as shown in FIG. 4.

Technical effects and benefits of the present invention include providing a system that includes a computing device by which first and second commands are inputted, first and second resources disposed in communication with the computing device to be receptive of the first command and responsive to the first command with first and second energy demands in first and second response times, respectively, and a managing unit disposed in communication with the computing device to be receptive of the first and second commands and with the first and second resources to allocate tasks associated with the first command to one of the first and second resources in accordance with the second command. The second command is based on the first and second energy demands and the first and second response times.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system, comprising:
a computing device by which first and second commands are inputted;
first and second resources disposed in communication with the computing device to be receptive of the first command, the first resource being configured to provide regular service and responsive to the first command with a first energy demand in a first response time and the second resource being configured to provide green service and responsive to the first command with a second energy demands in second response time; and
a managing unit disposed in communication with the computing device to be receptive of the first and second commands, the managing unit being further disposed in communication with the first and second resources to allocate tasks associated with the first command to one of the first and second resources in accordance with the second command,
the managing unit being configured to present an offer for the green service of the second resource as a request for the second command that includes the first and second energy demands and the first and second response times, and the second command being an affirmative or negative response to the offer for the green service;
wherein a third command is inputted by way of the computing device in response to the offer for the green service, the managing unit being responsive to the third command to provide an estimate for the first and second energy demands and/or the first and second response times; and
wherein a fourth command is inputted by way of the computing device following the provision of the estimate, the fourth command being an upper bound for the first and second energy demands and/or the first and second response times, and wherein the managing unit is further configured to accept the upper bound if meeting the upper bound is possible and to negotiate until a final agreement is met if meeting the upper bound is not possible.

2. The system according to claim 1, wherein the first and second resources and the managing unit are provided by a service provider.

3. The system according to claim 1, wherein the first and second resources and the managing unit are associated with a cloud computing network.

4. The system according to claim 1, wherein the first command comprises a request for computing or software service.

5. The system according to claim 1, wherein the first and second energy demands comprise expected energy requirements.

6. The system according to claim 1, wherein the first and second energy demands comprise expected energy costs.

7. The system according to claim 1, wherein the first and second energy demands comprise energy footprints of the first and second resources.

8. The system according to claim 1, wherein the first and second energy demands comprise fuel types used to generate energy for the first and second resources.

9. The system according to claim 1, wherein the managing unit issues a report of energy demand and/or response time at the completion of the allocated tasks.

10. The system according to claim 1, wherein the first and second resources and the managing unit are housed together.

11. A method of managing energy consumption in a system, the method comprising:
receiving first and second commands inputted into a computing device;
determining in response to the first command that a first resource is configured to provide regular service with a first energy demands and a first response times and that a second resource is configured to provide green service with a second energy demand and a second response time; and
allocating tasks associated with the first command to one of the first and second resources in accordance with the second command, the second command being based on the first and second energy demands and the first and second response times, the method further comprising:
presenting an offer for the green service as a request for the second command that includes the first and second energy demands and the first and second response times such that the second command is an affirmative or negative response to the offer for the green service;
receiving a third command inputted into the computing device as a response to the offer for the green service;
estimating in response to the third command the first and second energy demands and/or the first and second response times of the first and second resources, respectively
receiving a fourth command inputted into the computing device following the estimating, the fourth command being an upper bound for the first and second energy demands and/or the first and second response times, the method further comprising:
accepting the upper bound if meeting the upper bound is possible; and
negotiating until a final agreement is met if meeting the upper bound is not possible.

12. The method according to claim 11, further comprising issuing a report of energy demand and/or response time at the completion of the allocated tasks.

13. A non-transitory computer program product for managing energy consumption in a system, the computer program product comprising:
a tangible storage medium readable by a processing circuit and storing instructions for execution, by the processing circuit, a method comprising:
receiving first and second commands inputted into a computing device;
determining in response to the first command that a first resource is configured to provide regular service with a first energy demands and a first response times and that a second resource is configured to provide green service with a second energy demand and a second response time; and
allocating tasks associated with the first command to one of the first and second resources in accordance with the second command, the second command being based on the first and second energy demands and the first and second response times, the method further comprising:
presenting an offer for the green service as a request for the second command that includes the first and second energy demands and the first and second response times such that the second command is an affirmative or negative response to the offer for the green service;
receiving a third command inputted into the computing device as a response to the offer for the green service;
estimating in response to the third command the first and second energy demands and/or the first and second response times of the first and second resources, respectively;
receiving a fourth command inputted into the computing device following the estimating, the fourth command being an upper bound for the first and second energy demands and/or the first and second response times, the method further comprising:
accepting the upper bound if meeting the upper bound is possible; and
negotiating until a final agreement is met if meeting the upper bound is not possible.

14. The method according to claim 13, further comprising issuing a report of energy demand and/or response time at the completion of the allocated tasks.

* * * * *